April 17, 1951   W. E. GUSTIN   2,549,460
LUBRICANT AND DUST SEAL
Filed Oct. 7, 1948

Inventor:
William E. Gustin

Patented Apr. 17, 1951

2,549,460

UNITED STATES PATENT OFFICE 2,549,460

LUBRICANT AND DUST SEAL

William E. Gustin, Waterloo, Iowa, assignor to Deere Manufacturing Co., Dubuque, Iowa, a corporation of Iowa Application October 7, 1948, Serial No. 53,318

3 Claims. (Cl. 286—1)

This invention relates to improved seal means for sealing the junctures of a plurality of relatively movable parts against the escape of lubricant and/or the entrance of dust. More particularly, the invention relates to a pair of related seal means for sealing a joint or juncture which has angularly related surfaces.

A typical installation in which a preferred form of the invention finds utility includes an internal combustion engine having a pair of parts, such as housings, secured together in side-by-side relationship and wherein a shiftable or movable member extends from one housing into another. Because of variations in manufacture, the alignment of openings in the housing parts through which the member extends may not always be perfect. Further, because of vibrations inherent in operation of the engine, the housing parts may oscillate or shift with respect to each other. Consequently, it is desirable to seal a surface surrounding one of the openings and normal to the axis of the movable member. Further, inasmuch as it is desirable that one of the openings through which the movable member extends be made somewhat larger than the member to accommodate misalignment, it becomes feasible to provide a sleeve which presents a cylindrical surface angularly related or normal to the surface surrounding the opening, and it becomes necessary to seal this second surface. The primary object of the invention, then, is to provide improved sealing means for sealing related surfaces of the character described. Other objects of the invention are to provide: A sealing structure that is relatively inexpensive, albeit highly effective for the purposes intended; and a sealing structure that will readily accommodate variations in manufacture resulting in minor misalignment between the housing parts.

The foregoing and other important objects and desirable features inherent in and encompassed by the invention will become apparent to those skilled in the art as the disclosure of a preferred embodiment of the invention is more fully made in the following detailed description and accompanying sheet of drawings in which.

Figure 1:
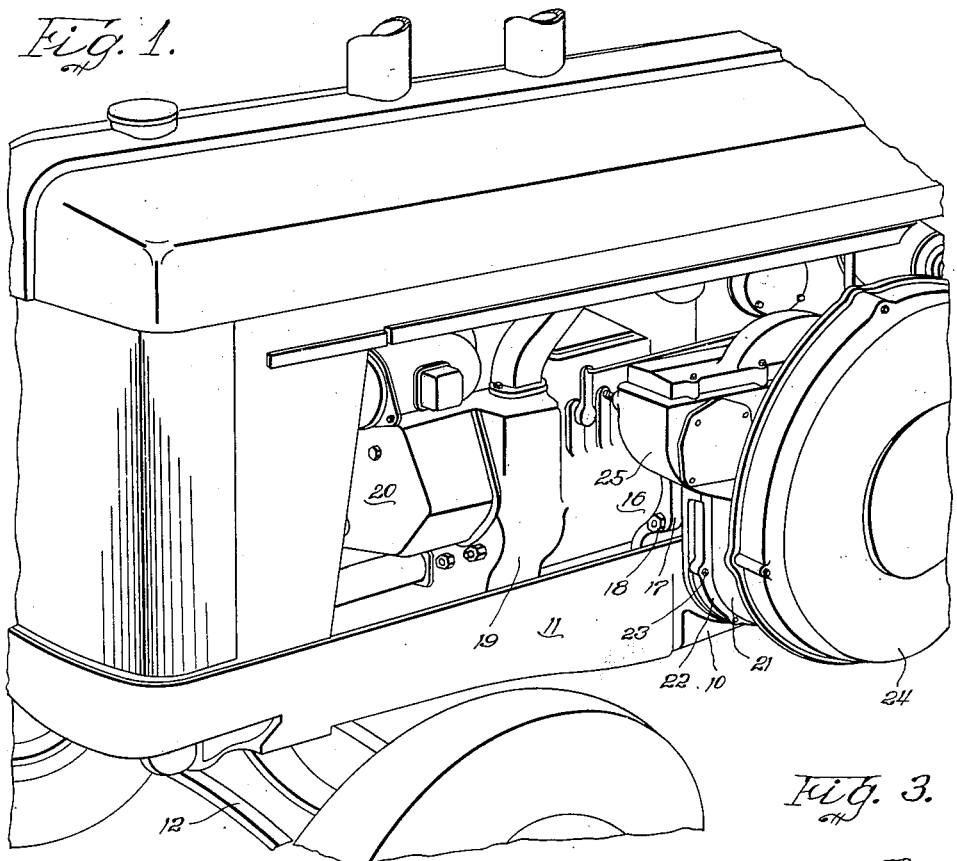
Figure 1 is a perspective view of the front portion of a tractor showing generally the relationship between internal combustion engine parts wherein the disclosed form of the invention has utility.

The illustration of the tractor construction shown in Figure 1 is not intended to establish limitations on the applicability of the invention but is intended primarily to show a typical installation to which the invention may be adapted. The particular type of tractor illustrated is similar to that shown in U. S. Patent 1,919,069. Such tractor includes a main body made up of a rearwardly disposed main case 10 to the forward or front face of which is secured a forwardly extending frame 11 that provides the forward portion of the tractor. The main case serves as a housing to contain change-speed transmission gearing and final drive gearing for rear traction wheels, none of which is shown, since it may be largely conventional. The forward portion of the tractor is supported on a wheeled axle 12.

Figures 2, 3:
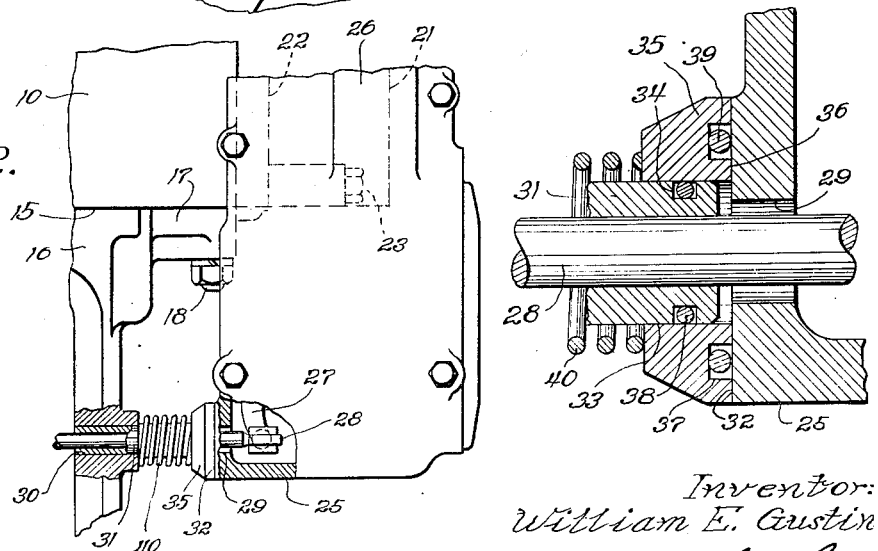
Figure 2 is an enlarged view, partly in section, showing the side-by-side relationship between a pair of related engine parts.
Figure 3 is a fragmentary sectional view on an enlarged scale showing the detailed arrangement of the sealing structure.

The front or forward face of the main case 10 is indicated at 15 in Figure 2 and from this face an internal combustion engine cylinder casting 16 extends forwardly, this casting having at its rear portion a peripheral flange 17 by means of which the casting is rigidly mounted on the main case 10. The numeral 18 designates a stud and nut, of which there are several, as representative of one form of means by which the flange 17 is secured to the main case 10.

The cylinder casting 16 contains a pair of forwardly extending horizontal cylinders and has secured thereto a cylinder head 19 to which is secured a valve cover 20, the details of all of which are amply disclosed in the patent referred to above.

In the particular type of tractor illustrated, the crank shaft of the engine runs transverse to the longitudinal center line of the tractor and extends at the left hand side of the tractor into a secondary engine part 21 which has a peripheral flange 22 secured to the left hand side wall of the main case 10 by a plurality of cap screws 23. The engine part 21 is also in the form of a casting and has secured to its left hand portion a cover housing 24 which encloses a flywheel keyed to the outer end of the engine crank shaft, neither of which is shown. That portion of the crank shaft within the engine part or casting 21 serves to drive a gear train (not shown) which ultimately drives a rotating part for an engine governor (likewise not shown) contained in a forward extension portion 25 of the casting 21. The particular details of the gear train and the governor mechanism form no part of the present invention and are referred to herein in connection with the illustration of the relationship between the castings 10, 16 and 21. In Figure 2, it will be noted that the left hand side wall of the cylinder casting 16 is spaced transversely inwardly from the right hand side wall of the extension 25 on the casting 21. The casting 21 is provided with a cover 26 which extends forwardly to cover the extension 25. A portion of the cover has been broken away in Figure 2 to expose a control arm 27 which is part of the governor mechanism referred to. This arm is connected to a movable control member 28 which extends through an opening 29 in the inner or right hand side wall of the casting extension 25. The control member 28 continues to the left (as viewed in Figure 2) and enters the cylinder casting 16 for the purposes of controlling fuel pumps (not shown) contained within the casting 16; although, the mechanism controlled by the rod or member 28 is immaterial here. The side wall of the casting 16 that is proximate to the inner side wall of the casting extension 25 is provided with an opening 30 (Figure 3) which is considerably larger in diameter than the control member 28 and which receives tightly therein the reduced end portion of a sleeve member 31. The opposite end of the sleeve member terminates short of the proximate wall of the casting extension 25, which wall is provided with a circular surface 32 provided in a plane normal to the axis of the movable control member 28. The member 28 is axially slidable through the sleeve 31 as its position is changed by the governor arm 27.

At least that portion of the sleeve 31 proximate to the opening 29 and surface 32 is formed as a cylindrical surface 33 in which is provided an annular groove 34. A collar member 35 closely encircles the cylindrical surface 33 and has a radial face portion 36 which contacts the radial face 32 on the casting extension 25. The radial face 36 is provided with an annular groove 37 which, like the groove 34, is substantially rectangular in cross section.

The groove 34 carries therein a sealing member preferably in the form of an O ring 38 and the groove 37 carries a similar, but larger, member or O ring 39. A compression spring 40 is interposed between the proximate wall of the casting 16 and the exposed face of the collar member 35, the purpose of the spring being to urge the collar and seal ring 39 against the radial wall 32 on the casting extension 25. Each of the rings 38, 39 will, of course, have substantially an oval cross section when compressed in its respective groove, thus providing an effective seal against the escape of lubricant from or entrance of dust into the opening 29. Both rings 38 and 39 provide means for excluding dust from the control member 28 and consequently dust cannot find its way between the outer surface of the control member 28 and the interior surface of the sleeve 31. The seal rings 38 and 39 may be formed of any suitable resilient material, such as synthetic rubber compositions presently available.

It very often occurs that the boring and tapping of holes in the left hand side wall of the main case 10 for the purpose of receiving the cap screws 23 may not be accurately accomplished with respect to the alignment of the opening 30 in the casting 16 and the opening 29 in the extension 25 of the secondary casting or engine part 21. Minor misalignment between these two openings can be accommodated by making the opening 29 somewhat larger than the outside diameter of the control member 28, as illustrated. Because of the enlargement of the opening 29 over the control member 28, it becomes necessary to seal the opening against the escape of lubricant from the casting or housing extension 25 and likewise to prevent the entrance of dust into the casting extension through the opening. It is found that this result is nicely accomplished by the sealing structure shown.

Since the sleeve 31 is rigidly carried by the casting 16 and the collar 35 is carried by the sleeve, any variations in manufacture which tend to misalign the openings 29 and 30 will result in a minor displacement of the collar 35 radially with respect to or normal to the axis of the control member 28, which displacement is, of course, not serious because of the seal 39. Similarly, the overhanging relationship of the casting extension 25 with respect to the engine casting 16 may result in some vibration and relative movement of the parts 16 and 25 during operation of the engine. Such relative movement that occurs in the plane of the juncture between the radial faces 32 and 36 will be accommodated by the seal 39. Relative movement of the parts 16 and 25 toward each other, or along the axis of the control member 28, will be accommodated by the seal 38 between the interior cylindrical surface of the collar 35 and the external cylindrical surface on the sleeve 31. In either case, the sealing ring involved will slide or roll and, being slightly under compression, will maintain its sealing effectiveness. It will be understood, of course, that neither variations in manufacture nor vibration and relative movement between the parts 16 and 25 will be such as to displace either seal ring completely from operative relation to its associated surface. The compression spring 40 serves the double function of maintaining the collar 35 and seal ring 39 in sealing relationship to the radial wall 32 and of maintaining the sealing relationship between the interior cylindrical surface of the collar and the seal 38, inasmuch as the spring tends to urge the collar constantly to the right, as viewed in Figures 2 and 3.

The foregoing will undoubtedly suggest other applications of the invention and various modifications and alterations in the form illustrated, all of which may be resorted to without departing from the spirit and scope of the invention as defined in the appended claims.

What is claimed is:

1. In combination: first and second parts having, respectively, first and second generally parallel wall portions, said wall portions having aligned openings; a shaft extending through said openings, at least the first wall portion having an outer face disposed radially about its opening as respects the shaft; a sleeve member surrounding the shaft between the openings and having one end portion carried by the second part and its other end portion closely spaced axially from the radial face about the opening in the first part; a collar member slidably surrounding the sleeve member at said end portion thereof and bridging the space between said end portion of the sleeve member and said radial face about the opening in the first part, said collar member having a radial face complementary to the radial face of the first part about the opening therein; biasing means between the second part and the collar member for urging the radial face of the collar member toward the radial face of the first part; a seal between the sleeve and collar members, including an annular groove in one member and a resilient sealing ring of generally circular cross-section in the groove; and a seal between the radial face of the collar member and the first part, including an annular groove in one of the radial faces and a resilient ring of generally circular cross-section in said last-named groove.

2. A seal structure, comprising: first and second parts having, respectively, first and second generally parallel wall portions, said portions having aligned openings and at least the first wall portion having an outer face disposed radially about its opening; a cylindrical member coaxial with and extending between the openings and having an end portion associated in axially spaced relation with the opening in the first wall portion; a collar member axially slidably surrounding the cylindrical member at said end portion thereof and bridging the space between said end portion and the opening in the first wall portion, said collar member having a radial face complementary to the radial face of the first wall portion about the opening therein; yieldable means between the second wall portion and the collar member for urging the radial face of the collar member toward the radial face of the first wall portion; a seal between the cylindrical member and the collar member; and a seal between the radial face of the collar member and the radial face of the first wall portion.

3. In combination: a first part having an opening therein and an outer radial face surrounding the opening; a second part extending axially through the opening and of reduced diameter as respects the opening so as to be capable of shifting radially within the opening; a sleeve member surrounding the second part and having a cylindrical portion coaxial with and of larger outside diameter than the opening and terminating outwardly of the opening in axially outwardly spaced relation to the radial face; a collar surrounding the sleeve outwardly of said radial face and axially slidable on the cylindrical portion of the sleeve, said collar having an annular inner portion bridging the space between said cylindrical portion and the radial face, and further having a radial face complementary to the aforesaid radial face; an annular seal spaced axially outwardly from the first mentioned radial face and concentric with the cylindrical portion and effective between said cylindrical portion and the annular inner portion of the collar; a second annular seal in the form of a ring effective between said radial faces, said ring having an inside diameter greater than the outside diameter of the cylindrical sleeve portion; and yieldable means acting on the collar to urge the radial face axially toward the first mentioned radial face.

WILLIAM E. GUSTIN.

REFERENCES CITED

The following references are of record in the file of this patent:

UNITED STATES PATENTS

| Number | Name | Date |
| --- | --- | --- |
| 653,859 | Bulkley | July 17, 1900 |
| 874,652 | Bailey | Dec. 24, 1907 |
| 1,510,956 | Perkins | Oct. 7, 1924 |
| 1,563,836 | Copp | Dec. 1, 1925 |
| 1,634,655 | Elstone | July 5, 1927 |
| 1,947,198 | Goble | Feb. 13, 1934 |